United States Patent [19]

Hart

[11] Patent Number: 5,785,392
[45] Date of Patent: Jul. 28, 1998

[54] SELECTABLE GRADE AND UNIFORM NET SHOE FORCE BRAKING FOR RAILWAY FREIGHT VEHICLE

[75] Inventor: James E. Hart, Westmoreland County, Pa.

[73] Assignee: Westinghouse Air Brake Company, Wilmerding, Pa.

[21] Appl. No.: 630,075

[22] Filed: Apr. 15, 1996

Related U.S. Application Data

[63] Continuation-in-part of Ser. No. 597,277, Feb. 6, 1996.
[51] Int. Cl.$^6$ ............................................ B60T 13/00
[52] U.S. Cl. ........................................ 303/7; 303/20
[58] Field of Search ............................. 303/7, 132, 20, 303/9, 9.66, 9.69, 22.6

[56] References Cited

U.S. PATENT DOCUMENTS 5,551,765  9/1996  Sich ............................................. 303/7

Primary Examiner—Peter M. Poon
Attorney, Agent, or Firm—Buchanan Ingersoll

[57] ABSTRACT

A railway freight brake method and apparatus for operating vehicles in a freight train having a locomotive and a number of railway freight vehicles wherein the individual railway freight vehicles can be controlled in a grade descending mode. When desired, such as when the locomotive transmits a grade mode signal to the individual vehicles, the individual vehicles can brake to produce a generally uniform net shoe force on the wheels of the vehicles. The generally uniform net shoe force can be limited on each vehicle to a value or ratio, such as a percentage of net braking ratio of the given vehicle. On-board calculations can be done in a microprocessor to calculate the vehicle brake cylinder pressure corresponding to the desired net shoe force. This calculation can be done using car parameters stored on-board the vehicle.

23 Claims, 6 Drawing Sheets

THEORETICAL: GSF = CYL. AREA * PRESSURE * LEVER RATIO
NSF = GFS * EFFICIENCY FACTOR

NET EQUATIONS:

(1) $F_N = (P-a) * N$ (2) $N = F_N/(P-a) = \dfrac{(F_1 - F_2)}{(P_1 - P_2)}$ (3) $P = (F_N/N) + a$ (4) $a = P - (F_N/N)$ WHERE: $F_N$ = NET (ACTUAL) BRAKE SHOE FORCE (LBS)
P = BRAKE CYLINDER PRESSURE (PSI)
a = BCP AT ZERO NSF
$F_1, P_1$ ETC = POINTS OR ACTUAL CORRESPONDING VALUES FOR F & P

SELECTABLE GRADE AND UNIFORM NET SHOE FORCE BRAKING FOR RAILWAY FREIGHT VEHICLE

RELATED APPLICATION

This application is a continuation-in-part of co-pending application Ser. No. 08/597,277, filed Feb. 6, 1996, which is incorporated herein by reference.

BACKGROUND OF THE INVENTION

Conventional pneumatic freight braking systems are generally designed to produce a desired level of braking via generally equal brake cylinder pressures on all of the individual cars in a train for any given brake application. The brake signal from the locomotive is generally given as a brake pipe pressure reduction which is reflected to a specific desired brake cylinder pressure. However, in practice there may be a somewhat substantial and sometimes random variation in the actual brake cylinder pressure produced on various cars by any given brake application signal. These variations can be caused by a number of normal pneumatic variances and mechanical factors which differ from car to car. A conventional pneumatic brake system for freight cars is an equalizing type system wherein the auxiliary reservoir pressure reduction generally matches the brake pipe pressure reduction. The resultant brake cylinder pressure is dependent on the volume relationship between the auxiliary reservoir and the brake cylinder (including piping, clearances, and the voided piston displacement volumes). During an emergency application the auxiliary and emergency reservoirs are both equalized with the brake cylinder volume, so that again the final pressure depends directly on those respective volumes. Because of normal variation in these parameters a normal range of variance is experienced in the actual brake cylinder pressures produced on individual cars within a train in both emergency and service braking. Brake cylinder pressure produces the friction braking force on a railway vehicle, and therefore variations in the pneumatic pressures result in variation in the actual brake retarding forces of the vehicle.

In addition to the pneumatic variations there are certain mechanical variations from car to car which compound the variations in the resulting brake forces including the net brake shoe force and the brake retarding force. Various freight cars built at different times can have different size and different types of brake cylinders, different mechanical leverage ratios, and can have different mechanical efficiencies. All of these factors directly effect the net brake shoe force that is produced by any given brake cylinder pressure. The effective coefficient of brake shoe friction then determines the actual brake retarding force generated by any given brake shoe force. When using the electro-pneumatic brakes, it is possible to control the brake cylinder pressure more precisely than with conventional pneumatic brakes, however the mechanical variations still exist.

While pneumatic braking is used for a number of purposes in normal train operation, such as to slow or stop a train, to control dynamics (slack run-in, run-out) in the train, special consideration can be given to the operating condition when braking is used to maintain the speed of a train on a descending grade. During this condition friction braking is often used to supplement the dynamic braking supplied by the locomotives in the train. When grade braking, only up to about one-half of the available full service brake cylinder pressure is typically used, as needed, to assist in balancing the gravitational grade acceleration force imparted to the train. If the total train retarding force exactly matches the grade accelerating force, acceleration is zero and velocity is held constant. If the total retarding force is greater, velocity decreases.

Although the train braking requirements in grade braking would appear to be modest, the actual grade braking requirements on the individual vehicles can be harsh. Grade braking often requires that braking during long descents be sustained for a considerable period of time. During this time, the friction braking with a brake shoe on the tread portion of the wheel of the vehicle can cause substantial heating. In addition, because the overall train braking requirement may be seen as low, i.e., less than half of a full service application, many cars in a train that are empty may be operating at very reduced levels of braking due to empty/load systems on individual vehicles. Empty/load brake systems reduce the effective braking on empty vehicles to avoid locking or skidding the wheels of such empty vehicles during heavy braking. However, when viewed in the overall train braking system, such empty/load controls shift much of the grade train braking duty to the heavier vehicles. Therefore, the braking on the heavier vehicles in descending a grade can supply a substantially higher proportion of the speed control braking than the average vehicle in the train. Therefore, these heavy loaded vehicles are more prone to have high to excessive levels of wheel heating.

Because of the large number of vehicles and the various loadings on individual vehicles coupled with the individual train operating procedures, it is very difficult to isolate individual practices or equipment which may cause over heating. In addition to wheel heating, grade braking with conventional pneumatic systems which result in larger brake forces on some vehicles than others, can cause extra brake shoe wear on the vehicles that are braking proportionally more than others. It would therefore be desirable to have a brake system which would reduce the potential for high heating of individual freight vehicle wheels during long grade descents and to maintain train control on descent.

SUMMARY OF THE INVENTION

When grade braking, it is far more desirable to generate equal brake retarding forces or equal net shoe forces on all of the cars in the train, regardless of the actual weight or design net braking ratio of the individual cars. This best assures that the total train braking duty or effort required to balance a train at a given speed will be equally distributed among all of the braked wheels in the train. The braking horsepower and the heat generated in the wheels will therefore also be equally distributed. Having all of the wheels doing their fair and equal share of the braking for the entire train best assures that wheels on some cars will not be over-braked or become overheated. Overheated wheels can be gradually or suddenly damaged from excessive thermal stresses. While a system utilizing equal net shoe force can be used in a variety of train operations, it is presently considered highly advantageous that such system be utilized in a grade descending mode.

In modes other than grade descending, other train brake control methods may be more desirable. Some such other modes and methods have been described in co-pending application Ser. No. 08/597,277, filed Feb. 6, 1996, which is hereby incorporated by reference. In that application, brake commands are implemented to produce a system using train net braking ratio. It is to be understood that the present invention may be used in conjunction with any variety of other braking systems, brake command signals or options, including brake cylinder pressure. The invention may be used on either direct release or graduated release systems. One embodiment of a train utilizing the present invention includes an operator having available a mode selector which changes from his normal braking mode to a grade descent mode upon activation. When the operator selects the grade descent mode, a signal is sent to the individual cars in the train, which then change from their normal braking mode into equalized net shoe force braking. In the net shoe force mode, equal braking forces would generally be applied to each car in the train that is equipped with the net shoe force, NSF, equipment. One method of using the invention includes the operator selecting the NSF mode in descending conditions. However, the invention also includes wherein specific equipment sense a condition in which NSF operation would be preferred and institute a mode change to the NSF mode.

The invention using the selectable grade mode can be implemented using the net shoe force braking or in other embodiments other braking methods consistent with grade descending vehicles. Similarly, the net shoe force braking method and devices of this invention can be used with the selectable grade operating mode and in other braking situations where it is desirable to generally equally distribute the train braking force throughout the wheels of the vehicles.

This invention relates to a railway freight train brake equipment for operation on-board a railway freight train having at least one locomotive and a plurality of railway freight vehicles or freight cars. The railway freight vehicle has a pneumatically operated friction brake, which is actuated by a force producing brake cylinder through mechanical linkage to a brake shoe. Valving on-board the freight vehicle can supply pressurized air from an on-board reservoir which acts as a storage volume, and the valving can release pressurized air from the brake cylinder. By selectively changing the pressure in the brake cylinder the valving can cause the mechanical friction brake to apply or release causing the braking force on the freight vehicle to increase or decrease. A brake signal indicative of a desired braking level of the train is transmitted to each freight car. When it is desired to operate the train in a different mode on a descending grade, a grade mode signal can also be transmitted from the locomotive to the freight cars. The signals may be transmitted independently or together as part of an overall locomotive to train communication system. Transmissions may occur either through pneumatic, electrical, fiber optics, radio telemetry, or other transmission apparatus. The signals are received on-board the individual freight vehicles and a processor such as a microprocessor controls operation of the valving to achieve the desired braking level.

When a grade mode signal is received on-board the vehicle, the mircroprocessor operates the valving consistent with a method for optimizing descending grade braking on a multiple vehicle freight train. When desired, such as when the grade mode signal has been received, the on-board processor and equipment can operate the valving to produce a generally uniform net shoe force on the wheels of all of the vehicles in the train. In preferred embodiments, the level of equal braking can be limited to a given value or ratio. In some embodiments, this ratio can be a net braking ratio of 0.25. Equipment on-board individual cars in the train can control the pressure in the brake cylinder to achieve uniform net shoe force by calculating the necessary brake cylinder pressure to produce the desired net shoe force. This calculation can use previously stored car parameters. These parameters can include linear relationships between the brake cylinder pressure and the net shoe force. In some embodiments the parameters may be stored as constants representative generally of the slope and intercept of the linear relationship between the brake cylinder pressure and the net shoe force for the individual car or for a representative grouping of railway cars. In a braking mode having uniform net shoe force, such modes normally will be utilized only in a portion of the braking range. Other braking schemes may be utilized in other portions of the braking range, such as emergency and full service for example.

The invention may be practiced using the methods of transmitting both a brake signal and a grade mode indicator signal from the locomotive to individual cars and receiving it on-board the individual freight vehicles in the train. These signals are then processed on-board the freight vehicle to control pressurization of the brake cylinders to variably apply and release the freight brakes and, when desired, such as when a grade signal has been received, to provide for applying the brakes to produce a generally equal net shoe force on all said vehicles.

DESCRIPTION OF SOME EMBODIMENTS

Figure 1A:
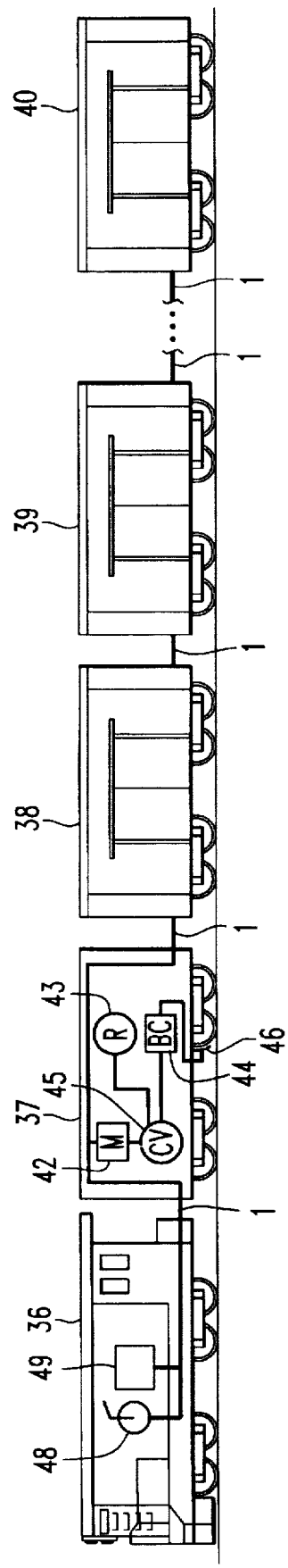
FIG. 1a is a diagrammatic representation of a railway freight train having a plurality of freight vehicles.

While many embodiments of the invention may be practiced, embodiments presently described herein will relate to train systems wherein each freight car has a microprocessor or similar processing means carried on-board the vehicle. In some railway vehicle systems more than one traditional car will be semi-permanently joined together and, in fact, only one microprocessor may control or supervise the braking operations on a plurality of joined vehicles, such as on multiple platform articulated cars. In addition, traditional freight braking signals have been transmitted from a locomotive by use of a pneumatic pipe commonly referred to as a brake pipe. While the invention may be used in embodiments using such conventional pneumatic means for transmitting a signal to the vehicles in the train, the embodiments described hereinafter will generally show an electrically or optically transmitted signal. However, it is understood that a radio signal, pneumatic signal, or any other means for conveying information from a locomotive to individual cars can be utilized in practicing the invention. Similarly, the train is shown with a single locomotive at the lead of the train for simple graphical purposes. However, it is understood that modern train handling techniques routinely use multiple locomotives, and the locomotive power may be distributed within the train. All of these practices are within the scope of the invention, and the diagrammatics used to explain the embodiments of the invention in the drawings are used to simplify a further understanding of the invention.

FIG. 1a shows a train having a locomotive 36 and a plurality of cars 37 through 40. As can be understood, freight trains can operate many more cars than shown and typically one hundred to two hundred car trains are not uncommon. While FIG. 1a depicts only four freight cars, it is to be understood that multiple cars of any length can be used in practicing the invention. In addition, a diagrammatic representation of equipment on-board car 37 is shown. However, it is understood that similar equipment can be placed on other cars in the train as shown in FIG. 1a.

Locomotive 36 shows a brake control valve 48 having a typical brake operator's handle. It is to be understood that while this shows a brake valve, microprocessor brake equipment, such as EPIC brake equipment manufactured by Westinghouse Air Brake Company or other microprocessor brake equipment, is equally applicable. Additionally, in some systems brake inputs may be automatically generated by on-board equipment to either supplement brake controls instituted by the operator through a brake controller 48 or to operate automatically in certain given conditions. A train line which may be fiber optic, wire, pneumatic, radio telemetry or other transmission means is shown at 1. The train line 1 transmits signals from the locomotive to the individual cars. More than one train line may be used. The command signals transmitted from the locomotive include a signal which is generally indicative of a value of braking desired for the train. This can be in any specific reference and for the example in the following embodiments will be considered to be given as generally a desired nominal brake cylinder pressure. It may also be given in units corresponding to a given brake pipe pneumatic condition, reduction or other value. Also on-board locomotive 36 is a selector 49 which permits the operator or automatic equipment to choose between a normal braking mode and a grade descending mode. When the operator or the equipment chooses the grade mode, a grade signal (G) that the grade mode has been chosen is transmitted from the locomotive via train line 1 or other means to the freight cars 37 through 40. As shown, the train line 1 depicts an electric wire with a linear connection between cars. It is understood that transmission systems for the grade and brake signal information can deliver the command signals from the locomotives generally simultaneously and independently of each vehicle and can be used with this embodiment. Equipment on-board each vehicle such as shown in car 37 processes the signals to control the braking on-board the car. In the embodiment shown in FIG. 1a, car 37 has a microprocessor (an MPU) 42 to which a train line 1 is connected. The microprocessor handles the command signals from the locomotive together with information it has calculated and/or stored and can control on-board pneumatic equipment. In the embodiment shown in FIG. 1a, a microprocessor 42 controls control valving 45 which applies or releases fluid pressure to a brake cylinder 44 using an on-board reservoir 43 as a supply of pressurized air. The brake cylinder 44 is connected through a mechanical linkage to a friction brake as represented by brake shoe 46. The microprocessor 42 can control the valving 45 differently in the grade braking mode than in the normal mode, to achieve the desired grade braking characteristics on each vehicle.

Figure 1B:
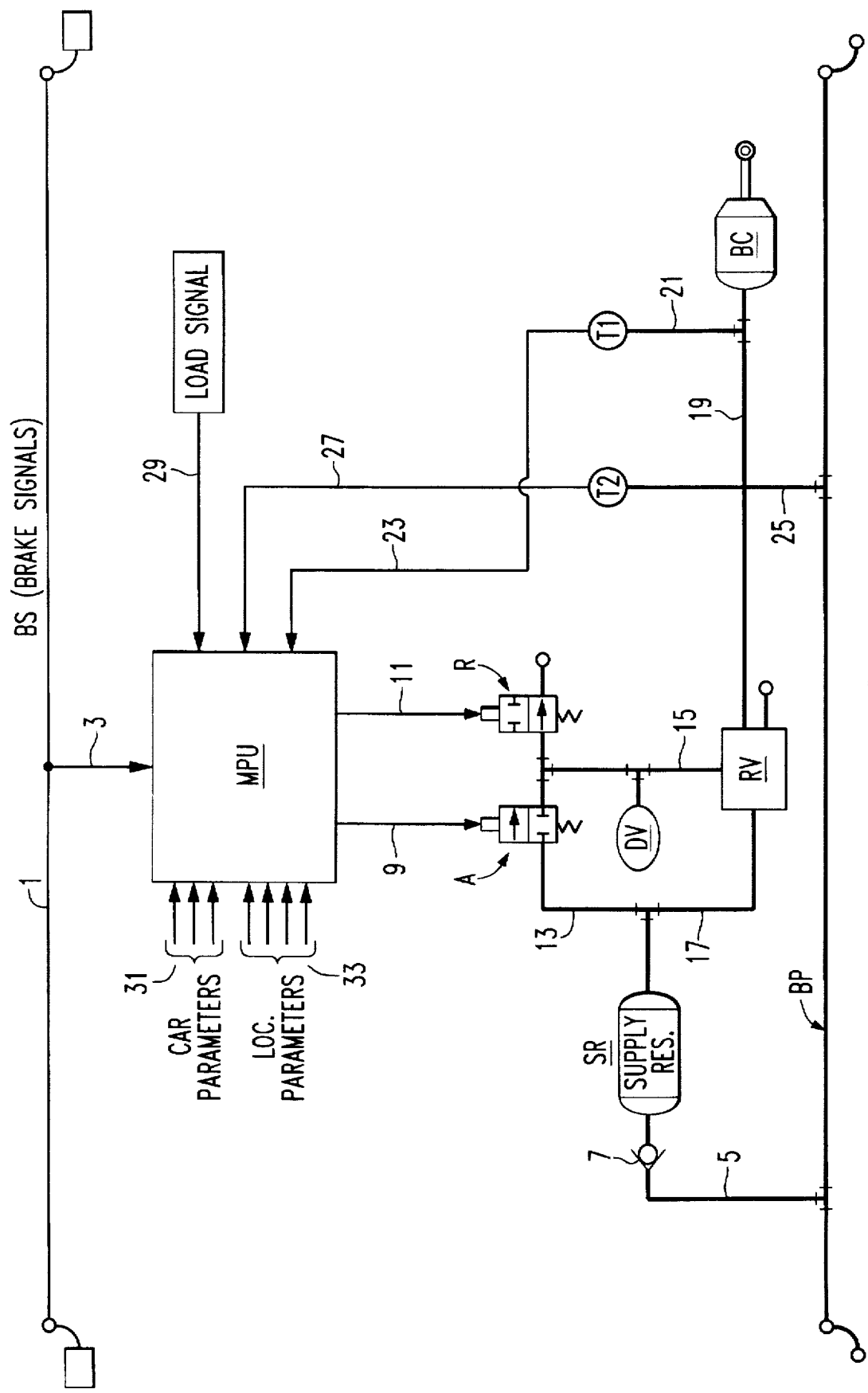
FIG. 1b is a diagrammatic view of a railway freight brake system on-board a train using a microprocessor on-board each freight car which is utilized in accordance with some of the embodiments of the present invention.

FIG. 1b is a diagrammatic representation of an electro-pneumatic brake system on-board a railway freight car such as 37. The present invention can be implemented through the use of a microprocessor unit MPU to which a train line wire 1 is connected by a branch wire 3. It is understood that this embodiment shown in FIG. 1 utilizes a "hard wired" electrical train system in which the signal is delivered to the on-board microprocessor by way of one or more wires. Typically, such wire could be an electrical wire, although other embodiments could equally employ fiber optics. Similarly, radio transmission signals/receivers or other communication means to communicate with the car borne equipment could be used. Typically such systems, whether using radio, electrical wire, or fiber optics would be transmitting information from a central location, usually in the locomotive cab or other site off-board the individual freight cars. Such signal could carry a desired level of braking signal and a signal indicative of operating the braking in a selected grade mode for the train. An application electromagnet valve A, and a release electromagnetic valve R respectively control the application and release functions. A relay valve such as RV, similar to a J type relay valve as manufactured by Westinghouse Air Brake Company, can be used in conjunction with the application (A) and release (R) valves and a dummy volume (DV) to control supply of pneumatic pressure to a brake cylinder, BC. Volume (DV) permits a more finely controllable pressure to the relay valve (RV) and can provide stability in the system. In some embodiments direct acting application and release valve mechanisms may be used, such that a relay valve may not be required. A supply reservoir, SR, to which a train line brake pipe, BP, is connected can also be connected to the brake cylinder via the relay valve, RV. Pneumatic pressure is supplied to the reservoir, SR, via a branch pipe 5 from the train line brake pipe, BP. A one way check valve, 7, may be used to maintain the supply reservoir, SR, charged to a pressure as carried in the brake pipe, BP and prevent discharge back into the BP. In addition, a brake pipe regulating valve (not shown) may also be used in some applications. Application electromagnetic valve, A, and release electromagnetic valve, R, are controlled by a microprocessor unit, MPU, via control wires 9 and 11 respectively. Application electro-magnetic valve A is a normally closed, two position, two way, solenoid operated valve having a spring return. While electromagnetic release valve R is a normally open, two-position, two-way, solenoid operated valve having a spring return. The inlet port of application electro-magnetic valve A is connected by a pipe 13 to supply reservoir SR, and the outlet port of valve A is connected by a pipe 15 to the control port of a relay valve RV. The electromagnetic application valve A is also connected to a port of the release electromagnetic valve R. The outlet port of release electromagnetic valve R is vented to the atmosphere. The supply port of relay valve RV is connected to a pipe 17 which is supplied from the supply reservoir SR. The delivery port of the relay valve RV is connected to a pipe 19 which communicates with the brake cylinder BC. The relay valve RV also has an exhaust port which is vented to atmosphere. A pressure to electric transducer T1 may also be used, and, if so, it may be connected through a pipe 21 to pipe 19, or may be directly connected to either the brake cylinder or the relay valve or pipe 19 or at any other convenient point. The transducer T1 is electrically connected to the microprocessor via wire 23 which could also be an optical fiber line. A similar transducer T2 may be connected to the brake pipe BP, directly on such as is shown via a pipe 25. Transducer T2 may also be connected at any other place in the car where the brake pipe pressure is readily available. Transducer T2 is electrically connected via wire 27 or optical fiber liner to supply a brake pipe pressure input to the microprocessor unit MPU.

Another input to the MPU can be a load signal such as shown at connection 29 where the varying car weight under operating conditions may be input to signify either a specific weight or an empty/load condition. Spring deflective or other load sensors may be used to supply the load signal, 29. Additional signals 31 may be input to give specific car parameters through the microprocessor unit. These signals may include data related to the relationship between the net shoe force and the brake cylinder pressure.

Inputs 33 are available to supply the microprocessor units with variables which may be specific to the locomotive or the train operating conditions.

When a brake application is called for the microprocessor unit energizes the system according to its internal operating instructions. Wires 9 and 11 cause the respective solenoid operators to switch positions to either apply or release the electromagnetic valves. The electromagnetic valve R is thus closed and the application electromagnetic valve A is opened to conduct pressure from the compressed air source in the supply reservoir SR to the dummy volume thereby controlling relay valve RV. Relay valve RV is piloted to its application or release positions. Transducer T1 provides feedback information to the microprocessor corresponding to the instantaneous brake cylinder pressure. When the microprocessor determines that the necessary brake cylinder pressure has been reached, wire 9 may be de-energized to drop out the solenoid application magnetic valve A and thereby cause the relay valve RV to cutoff further pressurization of the brake cylinder BC.

Similarly, when the release or reduction of the brake application is desired, the microprocessor unit can de-energize wires 9 and 11 causing both the electromagnetic valves A and R to assume their normal position, thereby causing release valve R to vent pressure from the dummy volume and the relay valve to vent to atmosphere corresponding portions of the brake cylinder pressure. The embodiments shown in FIG. 1b can be utilized in conjunction with the other teachings herein to control the specific braking on-board a freight car. Other similar known controls of application and release valves (A) (R) to supply, lap, and release fluid pressure can be used with this invention, including the use of a single valve. It is understood that the brake rigging is attached to the brake cylinder, and may be of any style or fashion including truck mounted or conventional.

The microprocessor unit (MPU) also receives a grade signal (G) from the locomotive. This signal may travel along the same train line 1 and the same branch line 3 to the MPU. As previously discussed, the grade signal may be transmitted separately or may be contained in a message signal transmitted periodically with the brake signal or other information from the locomotive. In some embodiments the grade signal (G) may be transmitted independent from the brake signal and may in fact use a different transmission mode such as radio telemetry. In the embodiment shown in FIG. 1a, the microprocessor receives the select grade (G) signal from train line 1 via branch line 3. When the microprocessor receives this signal, it recognizes that the operator or automatic equipment has requested the brakes now operate in a mode particularly conducive to braking on a descending grade.

The microprocessor in this embodiment is both a brake signal and a grade signal receiver. In other embodiments, separate receivers can be used such as electronic, fiber optic, or radio receivers. The microprocessor will then carry out the necessary decisions and calculations to determine the specific brake cylinder pressure needed to provide the specific value inferred for vehicle net shoe force in a grade mode. In embodiments using uniform net shoe force (NSF), the microprocessor may calculate the brake cylinder pressure required to produce the desired net shoe force for the corresponding desired level of braking requested by the brake signal. The microprocessor may do these things upon receipt of the select grade signal (G), or may do calculations ahead of time and generate pre-calculated values which can be selected from tables when the select grade mode has been chosen. Similarly, in some embodiments, it may be desirable for the microprocessor to generate tables of relationships between input data to be semi-permanently stored and periodically up-dated, while in other embodiments such information may be generated only when needed to perform a specific braking task.

Car parameters and values relating to the braking characteristics of the car may be stored in the car either permanently, semi-permanently, or periodically input. As shown in FIG. 1b these car parameters, together with other data, may be delivered to the microprocessor through inputs 31. In some applications it may be desired to use very specific parameters related to the exact car on which the microprocessor is operating. In other applications, satisfactory results may be obtained where the car parameters are input with data derived from and relating to a larger class of vehicles to which the individual car generally corresponds. In addition, periodic testing or measuring on-board the car may permit the system to automatically up-date its car parameter data. As can be seen in FIG. 1b, the utilization of the microprocessor to control the pneumatic hardware permits the same pneumatic hardware to be utilized both in the normal braking mode and in the select grade mode. This will generally be preferred, although in some embodiments certain pneumatic equipment may be used in only a single mode.

In some embodiments where the select grade mode uses a uniform net shoe force, it may be desirable for the system to be able to calculate the brake cylinder pressure that would be required to derive a given net shoe force. As previously described, the variation in pneumatic and mechanical conditions often vary from car to car. One method to achieve the necessary relationship would be to input profile data corresponding to specific brake cylinder pressure and brake shoe forces. This method may in fact be used on some embodiments. However, it may be more convenient to use a method of estimating the actual brake shoe force by assuming a generally linear relationship between the brake cylinder pressure and the net shoe force.

Figure 2:
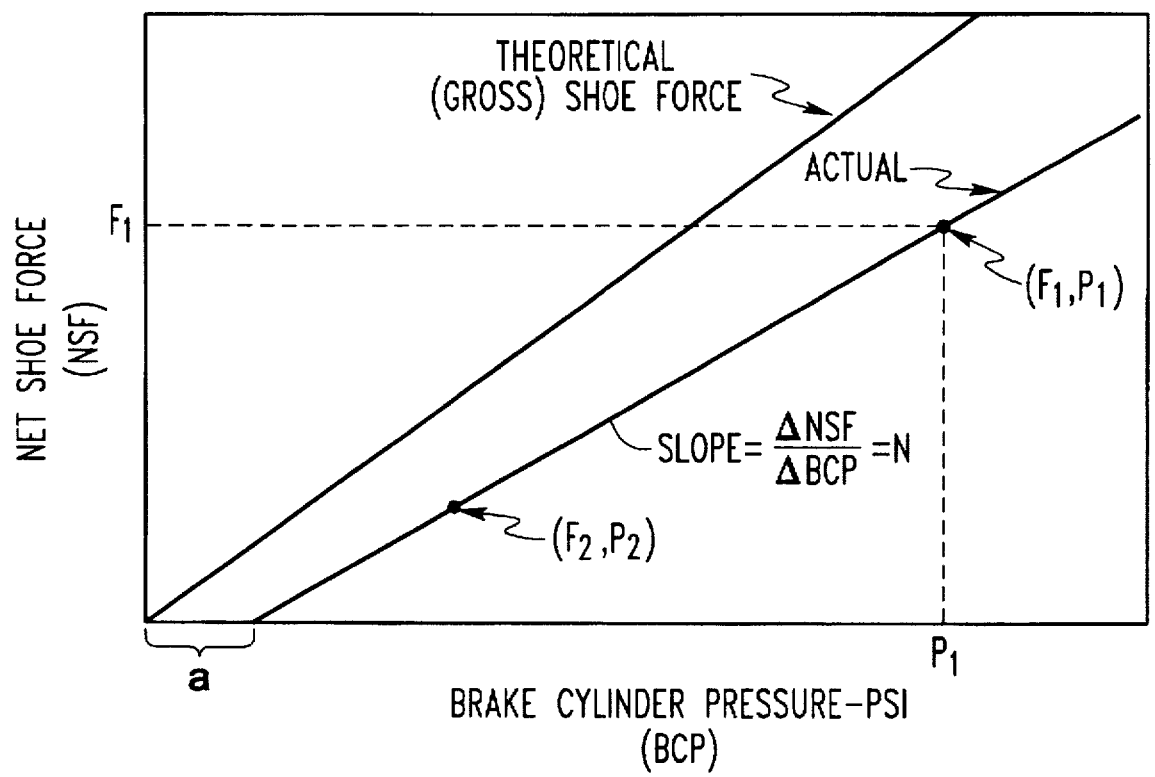
FIG. 2 is a graph showing a relationship between brake cylinder pressure and net shoe force for typical railway freight cars.

FIG. 2 shows a typical pattern for the relationship between brake cylinder pressure and net shoe force for a given freight car. The line through the origin represents the theoretical or "gross" shoe force. The offset line represents the actual or "net" brake shoe force. The theoretical neglects the friction loss due to the brake cylinder seals and fulcrum joints inherent in the mechanical systems, as well as the resistive force of the piston return spring. Both the theoretical and the actual relationships are typically generally linear functions of brake cylinder pressure, as illustrated. The brake rigging mechanical efficiency would be obtained by dividing the actual shoe force by the theoretical shoe force at any given brake cylinder pressure.

The general linear equations describing the relationship of the net shoe force and the brake cylinder pressures for any car can be calculated as follows:

$$F_N = (P - a) \times N \tag{1}$$

-continued $$N = F_N \div (P-a) = \frac{(F_1 - F_2)}{(P_1 - P_2)} \text{ (slope)} \tag{2}$$

$$P = (F_N \div N) + a \tag{3}$$

where: $F_N$ = net (actual) shoe force (measured in pounds)

$P$ = brake cylinder pressure (psi)

$N$ = slope $a$ = brake cylinder pressure ($P$) at zero actual force (offset or intercept)

and $(F_1, P_1)$ and $(F_2, P_2)$ are force and pressure points or corresponding values for force and pressure at any given points on the graph.

Using these equations, it is possible to calculate either the brake cylinder pressure required to produce any given Net Shoe Force, or to calculate the Net Shoe Force that would be expected for any given Brake Cylinder Pressure. In order to define the specific equations for any car, it is necessary to pre-determine values for a and N. These values may be obtained either from actual shoe force test results or by closely estimating these values using test results from identical cars or cars having very similar brake arrangements. In some instances it may be desirable to merely enter default values which closely represent the cars which will be operating on the train.

Specific values for the "a" (pressure intercept) and "N" (slope) are entered and may be stored semi-permanently in protected memory on each freight car microprocessor MPU that is equipped with electro-pneumatic brake equipment of the present invention. These may be input, such as at terminals 31 on FIG. 1b.

Figure 5:
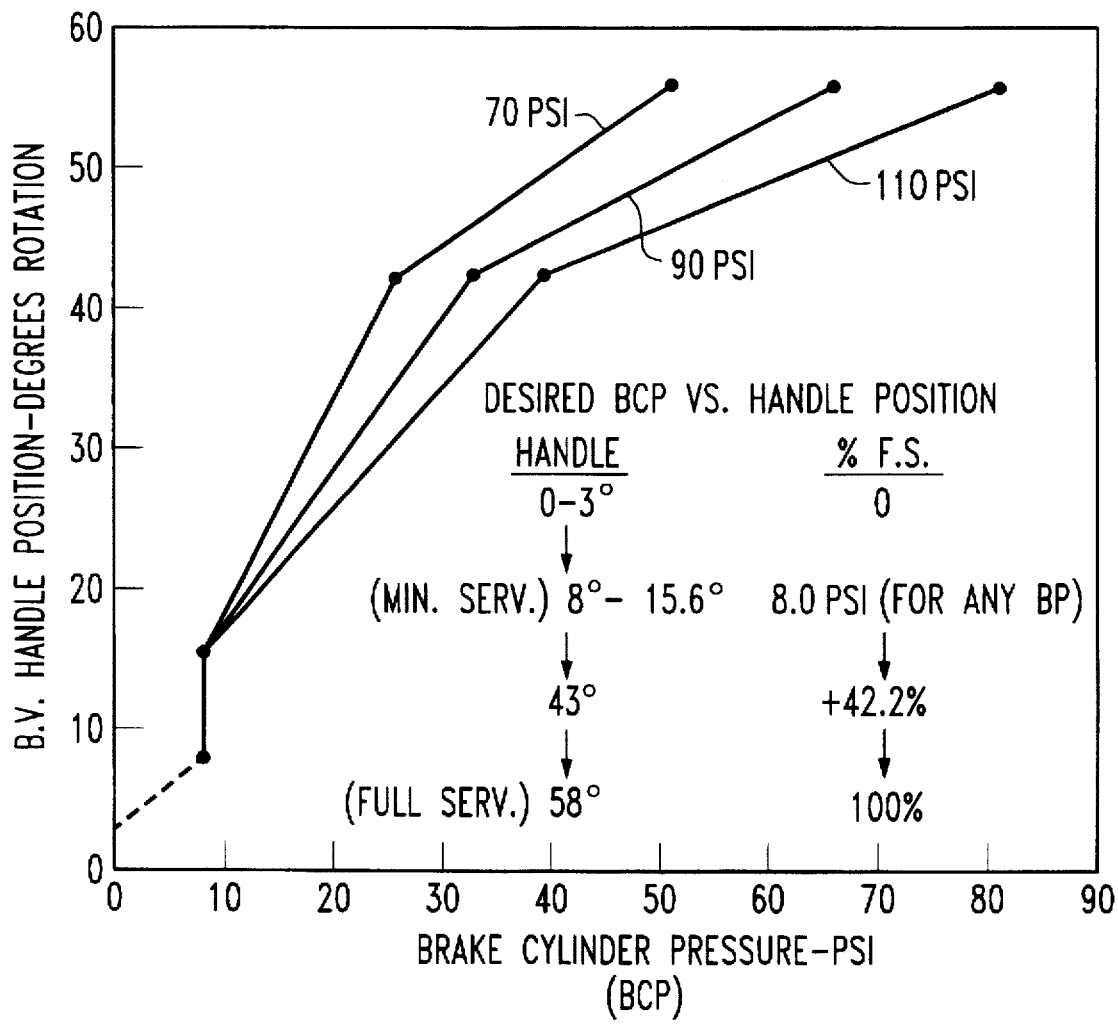
FIG. 5 is a graphic representation of a typical relationship between the locomotive brake valve handle position and the desired brake cylinder pressure.

The brake signals which come from the locomotive have been described as indicating a value of a desired level of braking. In addition, it may be desirable that the command signals from the locomotive that are initiated by operator controls generally produce a braking level somewhat consistent to what operators have experienced with past conventional equipment. When the conventional 26C pneumatic locomotive brake handle is rotated to apply the train brakes, a mechanical cam and cam follower acts against the regulating valve spring to control the reduction of equalizing reservoir pressure, and consequently the brake pipe pressure BP. The profile on the brake valve cam follows the general pattern of the curves shown on FIG. 5 with regard to the brake valve handle position and linear cam travel. With electro-pneumatic braking it may be desirable to generally match the degree of service application produced by the conventional pneumatic brake system to which train operators have become accustomed. Therefore, with electro-pneumatic brake equipment utilizing the present invention, FIG. 5 represents the train brake cylinder pressure demanded throughout the service range of rotation of the brake valve handle, for three distinct initial brake pipe operating pressures. The minimum reduction zone, from approximately 8 degrees to 15.6 degrees handle position, is interpreted to call for 8 psia train brake cylinder pressure, $BCP_T$ regardless of the initial brake pipe pressure $BCP_i$. From 15.6 to 43 degree rotation, the brake cylinder pressure $BCP_T$ increases linearly from 8 psi to a predetermined percentage (approximately 42.2 percent) of the difference between 8 psi and the full service pressure. From 43 degrees to approximately 58 degrees of handle rotation, the brake cylinder pressure for the train $BCP_T$ increases linearly to the maximum full service pressure. Desired full service brake pressure varies with initial brake pipe pressure and can be generally calculated by the following equation:

$BCP_{TF}=0.77\ BP_i-3.8$ (using gauge pressure in psi)

When the brake handle is moved beyond the full service zone to emergency, the desired emergency brake cylinder pressure, $BCP_{TE}$ is indicated by having a greater slope when the constant is 0.857 instead of 0.77.

These equations and FIG. 5 can be used to derive systems to generally match the standard equalization pressures produced by the conventional 26C pneumatic brake systems for full service and emergency brake applications. Although it is to be understood that conventional pneumatic systems are also subject to variations and fluctuation from equipment to equipment. These equations and the functions shown in FIG. 5 may be utilized in scaling the signals and in the microprocessor calculations such that the equipment utilizing the invention will perform in a more familiar way similar to the prior pneumatic equipment. These values will be subject to the range of brake levels over which the select grade or uniform net shoe force systems are utilized. It may not be desirable to utilize grade select nor uniform net shoe force in some situations or ranges such as emergency applications.

Figure 3:
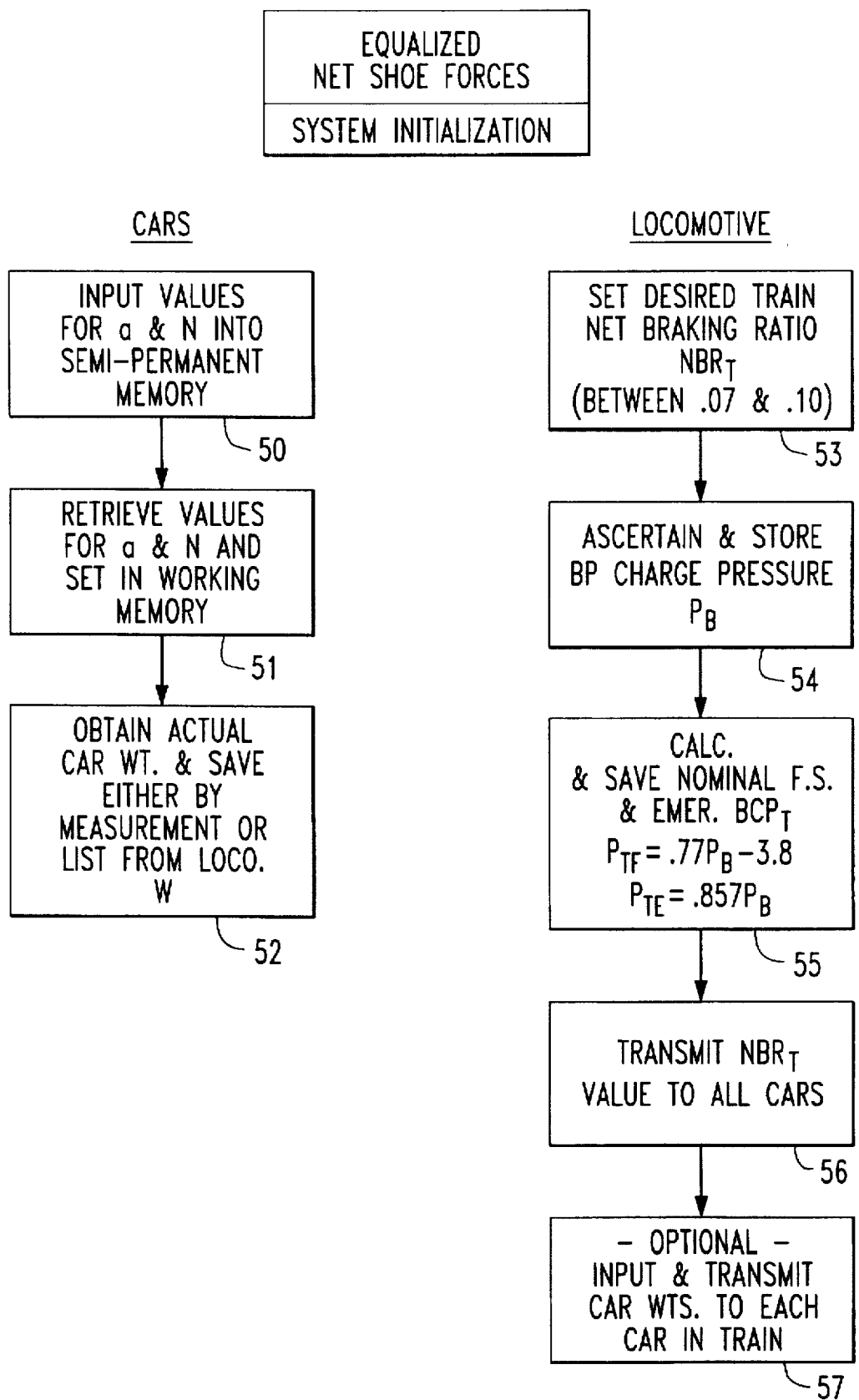
FIG. 3 is a flowchart showing steps in equalized net shoe force calculations.
Figure 4:
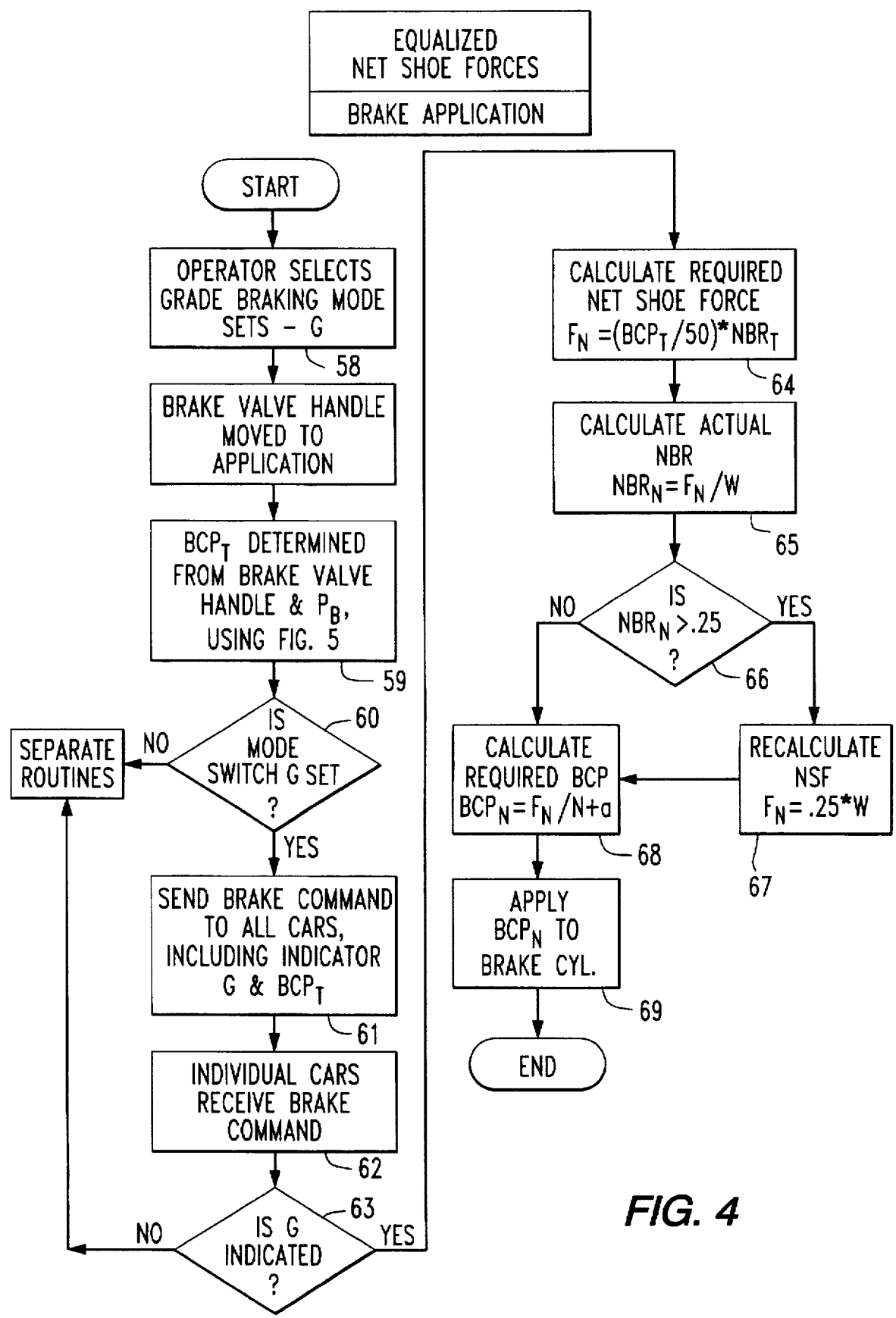
FIG. 4 is a flowchart showing methodology in brake application during some embodiments using equalized net shoe forces.

FIGS. 3 and 4 show flow charts of the method of operation of an embodiment of the invention, such as described in FIG. 1b, which utilizes an operator grade select mode having uniform net shoe force braking in that grade select mode. In addition, the example also illustrates the utilization of an embodiment in which the brake cylinder pressure is calculated from values such as those shown in FIG. 2.

Certain system initialization steps will be completed prior to the train operating to enable the system to correctly calculate and implement equal net shoe forces for service brake application. Typical system initializations are shown in FIG. 3 for both the individual freight cars and the locomotive(s).

On the individual cars equipped with electro-pneumatic brake equipment having embodiments of this invention, the values for the constants a and N must be determined for the following equation:

$$F_n = (P_n - a) \times N$$

where:

$F_n$ = net shoe force $P_n$ = brake cylinder pressure for the car $a$ = the brake cylinder pressure at zero net shoe force $N$ = the slope of the curve of the relationship between brake cylinder pressure and net shoe force.

These values can be either obtained or closely approximated from net shoe force tests on the actual freight car, or from values derived from such tests of cars having identical or very similar brake cylinder and rigging arrangements. Some typical linear relationship of pressure versus force has been illustrated graphically on FIG. 2. Once determined, the values for a and N may be stored in semi-permanent memory in the electronic control unit of the car. In other embodiments, they may be stored permanently or periodically up-dated either from roadside or from transmissions from the locomotive or other vehicles in the train. FIG. 3 at 50 shows the input values to the individual car. As has previously been discussed, such input values may in fact be input to the microprocessor MPU via car parameter inputs 31 in FIG. 1b. These values may be placed in the memory and stored at any time, in some instances when the vehicle is first put into service. However before train operation these values would be recalled or retrieved, 51. Where calculations require the actual car weight, W, such weight can either be measured or input on the vehicle, or in fact may be delivered via the train line or other transmission from a central source such as a locomotive or from a wayside location as the train is made-up, block 52.

An equivalent loaded train operating net braking ratio $NBR_T$ for the train can be selected if the normal mode of operation is to be the net braking train ratio as described in the previously cited co-pending application. The initial $NBR_T$ is set, 53. In addition, the locomotive brake control unit is given the value of the effective brake pipe operating pressure or nominal regulating valve pressure setting, which is usually between 70 and 100 psia, 54. This pressure setting may be used to predetermine the full service and emergency train brake cylinder pressures as shown in block 55. The information on the locomotive can then be transmitted as values necessary to all cars, block 56 and optionally individual car weights may be input or transmitted to the cars 57.

One embodiment of the methodology for deriving equal net shoe force (NSF) on all cars in a train is illustrated in the flow chart of FIG. 4. When the grade braking mode is selected by the operator, 58, and the brake valve control handle 48 is moved into the service braking zone, a train brake cylinder pressure $BCP_T$ is determined from interpreting the handle position and the brake pipe operating pressure according to FIG. 5, block 59. A brake command signal is sent from the locomotive, such as typically an electronic control unit on-board the locomotive to all of the freight brake control units on individual freight cars. This brake command signal specifies, in this embodiment, a $BCP_T$ and includes an indicator G for the selected grade braking mode. Block 60 and 61 verify that the select grade switch has been set, and send both the command signal and the grade signal to be transmitted to the individual vehicles. On receipt of the command signals, at a brake signal and grade signal receiver 62, the on-board freight car, equipment determines if in fact the select grade or G signal has been indicated, block 63. If in fact the grade signal has not been indicated in block 63, other routines may be used to either verify or communicate back to the locomotive. If in fact the grade signal G has been received, the microprocessor unit MPU calculates the required net shoe force demanded by the net brake cylinder pressure $BCP_T$ and the net braking ratio of the train $NBR_T$. This calculation is shown in block 64. Next each car will have its individual microprocessor calculate the actual net braking ratio ($NBR_N$ for the nth car) which is the net shoe force divided by the actual car weight, block 66. This is done so that it can be determined if the NBR for the car exceeds 25 percent on empty cars, which condition could create a potential for sliding wheels. While the present preferred embodiment contemplates the use of 0.25, block 64, other appropriate values can also be utilized. If in fact the net shoe force $F_N$ causes the braking ratio to exceed the preset limit, in this example 0.25, $F_N$ is then reset to the limited value, in this case to provide a net braking ratio of 0.25, block 67.

If in the flow chart the net braking ratio for the nth car is within the desired limit, block 66, then the microprocessor calculates the required brake cylinder pressure for that car to produce the target net shoe force $F_N$, block 68. This is done using the following equation:

$$BCP_N = F_N \cdot N + a$$

where:

N is the predetermined slope of the brake cylinder pressure minus the net shoe force function and a is the brake cylinder pressure at zero net shoe force.

These values have been illustrated in FIG. 5. As previously discussed, these values can be predetermined and stored on each specific car and saved in semi-permanent memory on-board that car via inputs 31.

Once the target $BCP_N$ is known on each car, the electronic brake control unit, such as MPU, on each will cause the electro-pneumatic valves (A and R) to operate to develop the target $BCP_N$ pressure in the brake cylinder as shown in block 69.

While certain embodiments of the invention have been shown in the figures and discussed in this description, it will be apparent to those skilled in the art that other embodiments are equally included within the scope of this invention. This invention covers those other embodiments as included within the scope of the following claims.

I claim:

1. Railway freight brake apparatus for operation on-board of rail vehicles in a train, such vehicles having a mechanical brake with friction brake shoes actuated by a pneumatic brake cylinder, and having a reservoir as a storage source of pressurized fluid, such apparatus comprising:

(a) brake signal receiver on-board such vehicle to receive a brake signal indicative of a desired braking level of such train;

(b) grade signal receiver on-board such vehicle to receive a grade signal indicative of operation in a grade mode on a descending grade;

(c) at least one valve to control the pressurization of such brake cylinder from such reservoir and the depressurization of such brake cylinder;

(d) processor to control said valve to supply such brake cylinder with pneumatic fluid from such reservoir and to exhaust such fluid to apply and release such mechanical brake in response to said brake signal; and (e) said processor controlling said valve to supply such brake cylinder with pneumatic fluid from such reservoir in response to said grade signal so as to produce generally equal net shoe forces on such brake shoes among such vehicles.

2. The railway freight brake apparatus of claim 1 wherein said brake signal is indicative of a brake cylinder pressure for such train; and wherein said generally equal net shoe forces are calculated by said processor.

3. The railway freight brake apparatus of claim 2 wherein said generally equal net shoe forces are limited by a pre-selected maximum value.

4. The railway freight brake apparatus of claim 3 wherein said pre-selected maximum value is that value of net shoe force which generally equates to a net braking ratio generally equal to 0.25 for such vehicle.

5. The railway freight brake apparatus of claim 2 wherein said brake signal includes a brake signal having a value representative of a train net brake ratio.

6. The railway freight brake apparatus of claim 5 wherein said equal net shoe forces are calculated by said processor and is limited by a pre-selected value.

7. The railway freight brake apparatus of claim 1 wherein said processor calculates a brake cylinder pressure for such vehicle corresponding to said equal net shoe forces from data stored on-board said vehicle.

8. The railway freight brake apparatus of claim 7 wherein said processor calculates said brake cylinder pressure of such vehicle using said stored data representative of a general linear relationship between brake cylinder pressure of such vehicle and net shoe force of such vehicle.

9. The railway freight brake apparatus of claim 8 wherein said stored data includes the slope of a generally linear relationship between the brake cylinder pressure of such vehicle and the net shoe force of such vehicle and a value for the maximum brake cylinder pressure at zero net shoe force of such vehicle.

10. Railway freight brake apparatus for on-board operation of rail vehicles in a train, such vehicles having a mechanical brake with friction brake shoes actuated by a pneumatic brake cylinder, and having a reservoir as a source of pressurized fluid, such apparatus comprising:

(a) brake signal receiver on-board such vehicle to receive a brake signal indicative of a desired braking level of such vehicle;

(b) at least one valve to control the pressurization of such brake cylinder from such reservoir and the depressurization of such brake cylinder;

(c) processor to control said valve to supply such brake cylinder with pneumatic fluid from such reservoir to apply and release such mechanical brake in response to said brake signal; and (d) said processor controlling said valve to supply said brake cylinder with fluid pressure from such reservoir and to exhaust such fluid so as to produce generally equal net shoe forces on such brake shoes among such vehicles.

11. The railway freight brake apparatus of claim 10 wherein said brake signal is indicative of a brake cylinder pressure for such train; and wherein said generally equal net shoe forces are calculated by said processor.

12. The railway freight brake apparatus of claim 11 wherein said generally equal net shoe forces are limited by a pre-selected maximum value.

13. The railway freight brake apparatus of claim 12 wherein said pre-selected maximum value is that value of net shoe force which generally equates to a net braking ratio generally equal to 0.25 for such vehicle.

14. The railway freight brake apparatus of claim 11 wherein said brake signal includes a brake signal having a value representative of a train net brake ratio.

15. The railway freight brake apparatus of claim 14 wherein said equal net shoe forces are calculated by said processor and is limited by a pre-selected value.

16. The railway freight brake apparatus of claim 10 wherein said processor calculates a brake cylinder pressure for such vehicle corresponding to said equal net shoe forces from data stored on-board said vehicle.

17. The railway freight brake apparatus of claim 16 wherein said processor calculates said brake cylinder pressure of such vehicle using said stored data representative of a general linear relationship between brake cylinder pressure of such vehicle and net shoe force of such vehicle.

18. The railway freight brake apparatus of claim 17 wherein said stored data includes the slope of a generally linear relationship between the brake cylinder pressure of such vehicle and the net shoe force of such vehicle and a value for the maximum brake cylinder pressure at zero net shoe force of such vehicle.

19. A method of controlling the braking of vehicles in a train having at least one locomotive and a plurality of freight vehicles, such method comprising:

(a) transmitting from such locomotive a brake signal indicative of a desired braking level of such train;

(b) selectively transmitting a grade signal from said locomotive when said locomotive is descending a grade;

(c) receiving said brake signal and said grade signal on-board freight vehicles in said train;

(d) processing said signals on-board such freight vehicles to control pressurization and depressurization of brake cylinders to apply and release friction brake shoes on such vehicles; and (e) controlling the brake cylinder pressure on such freight vehicle in response to receipt of a grade signal so as to provide generally equal forces on respective brake shoes among such freight vehicles.

20. The method of controlling the braking of vehicles in a train of claim 19 further comprising:

(a) calculating a brake cylinder pressure for such vehicles corresponding to said equal net shoe forces from data stored on-board said vehicles; and (b) using said stored data representative of a generally linear relationship between brake cylinder pressure and net shoe force for respective ones of such vehicles for calculating said brake cylinder pressure.

21. The method of controlling the braking of vehicles in a train of claim 20 wherein calculating said brake cylinder pressure using a generally linear relationship includes using the slope of a generally linear relationship between said brake cylinder pressure of such vehicle and the net shoe force of such vehicle, and the maximum brake cylinder pressure at zero net shoe force of such vehicle for each of such vehicles in said train.

22. The method of controlling the braking of vehicles in a train of claim 19 wherein said transmitting and receiving a brake signal further includes transmitting and receiving a signal having a value representative of a train net brake ratio.

23. The method of controlling the braking of vehicles in a train of claim 19 wherein said transmitting of a brake signal and of a grade signal includes transmission of such signals by one of a fiber optic line connected between said vehicles, an electrical line connected between said vehicles, and radio transmission.

* * * * *